April 23, 1963 W. A. ZIMMERMANN 3,086,346
POWER MOWER SAFETY DEVICE
Filed Jan. 23, 1961 2 Sheets-Sheet 1

*INVENTOR.*
WILLIAM A. ZIMMERMANN
BY
Chester W. Brown
ATTORNEY

April 23, 1963 W. A. ZIMMERMANN 3,086,346
POWER MOWER SAFETY DEVICE
Filed Jan. 23, 1961 2 Sheets-Sheet 2

INVENTOR.
WILLIAM A. ZIMMERMANN
BY
Chester W. Brown
ATTORNEY

////// # United States Patent Office 3,086,346
Patented Apr. 23, 1963

3,086,346
POWER MOWER SAFETY DEVICE
William A. Zimmermann, 3702 N. 16th St., Milwaukee, Wis.
Filed Jan. 23, 1961, Ser. No. 83,961
6 Claims. (Cl. 56—25.4)

This invention relates to improvements in power mowers of the type embodying a cutter head rotatable about a vertical axis.

In the type of power mower to which this invention relates, the engine is mounted on a four wheel supported body having its sides extending substantially vertically downward and serving as a shield encircling the rotary cutter head which carries the blades. However, in actual practice there is sufficient clearance between the lower margin of the shield and the ground to permit the toe end of an operator's shoe to be moved into the path of the rotating blades and thus seriously injuring the operator.

The principle object of this invention is to provide manually controlled mechanism which will elevate the blades above their normal cutting plane and into a position within the shielded area where contact with the blades cannot be made accidently.

Another object is to provide control mechanism for manually maintaining the blades in their normal cutting plane and which will automatically elevate the blades above their normal cutting plane and into a position within the shielded area upon release of the control mechanism by the operator.

A further object is to provide manually controlled mechanism for moving the blades into a safe position and which may be embodied in a power mower of the type herein illustrated without material alterations in power mower structure.

It is also an object to provide in control mechanism for the blades a simple combination of elements which may be cheaply manufactured, easily assembled and which is durable in operation.

Other objects will appear as the invention is hereinafter described with reference to the accompanying drawings, in which FIG. 1 is a perspective view of a power mower embodying my invention, a portion being broken away for clarity.

Figure 1:
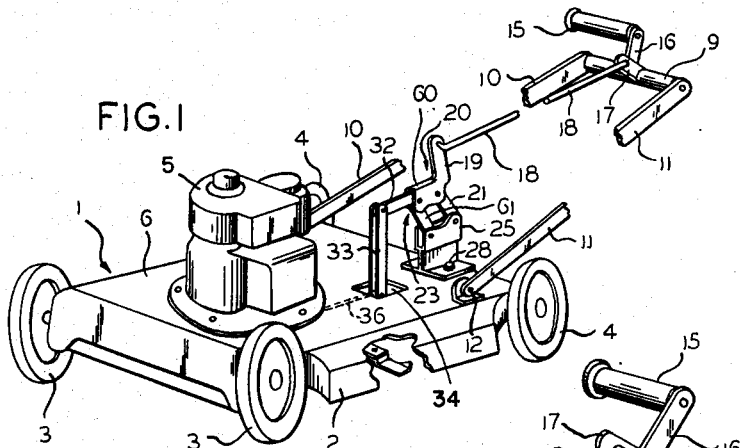

The power mower illustrated, more or less diagrammatically, comprises a body portion 1 having a depending apron 2 and is supported on front and rear wheels 3 and 4, respectively. An engine 5 is fixedly mounted on the top wall 6 of the body and is operatively connected directly to, or by means of a suitable gearing 7 on, a vertical shaft 8 which extends through the top wall 6 and into the area defined by the apron 2. (See FIGS. 5, 6 and 7.) At the rear of the body portion, handle bar 9 is carried by arms 10 and 11 pivoted to the body portion at 12, intermediate portions of the arms being broken away.

Figure 2:
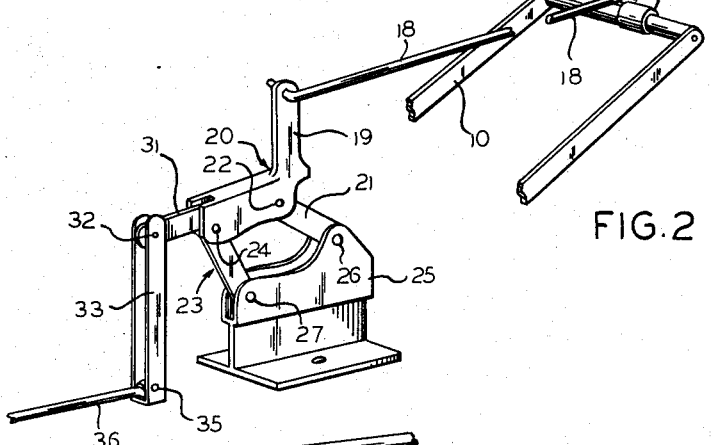
FIG. 2 is an enlarged detail view of a fragmentary portion of the control mechanism shown in perspective.
Figure 3:
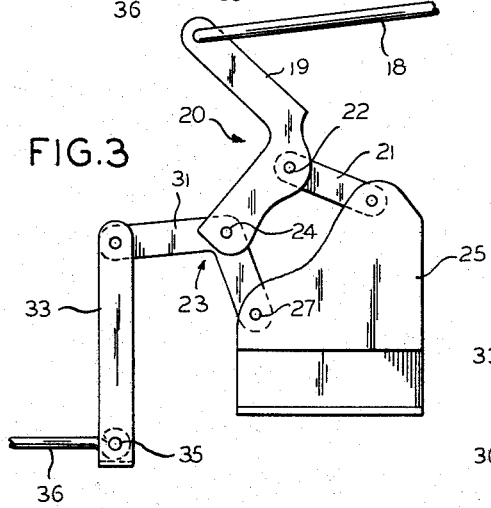
FIG. 3 is an enlarged detail view of a portion of the safety control mechanism illustrating one position of operation.

The manually operable mechanism for controlling the blades and illustrated in FIGS. 1, 2 and 3, comprises a handle 15 carried on an arm 16 pivoted on the handle bar 9, an arm 17 secured and extending normal to the arm 16, a link 18, a portion being broken away, pivotally connected at one end to the arm 17 and at the other end to an arm 19 on the L-shaped carrier 20 pivotally on the link 21 at 22 and on the bell-crank 23 at 24, the link 21 and bell-crank 23 being respectively pivotally mounted on the standard 25 at 26 and 27. The standard 25 is fixedly mounted on the body top 6 in any suitable manner, as by bolts 28.

Figure 5:
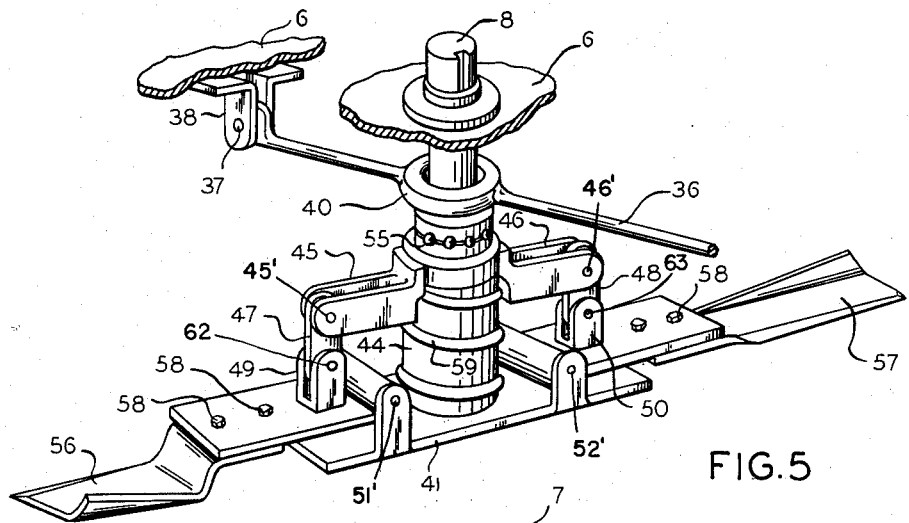
FIG. 5 is an enlarged detail view in perspective of another portion of the safety control mechanism illustrating one position of operation.
Figure 6:
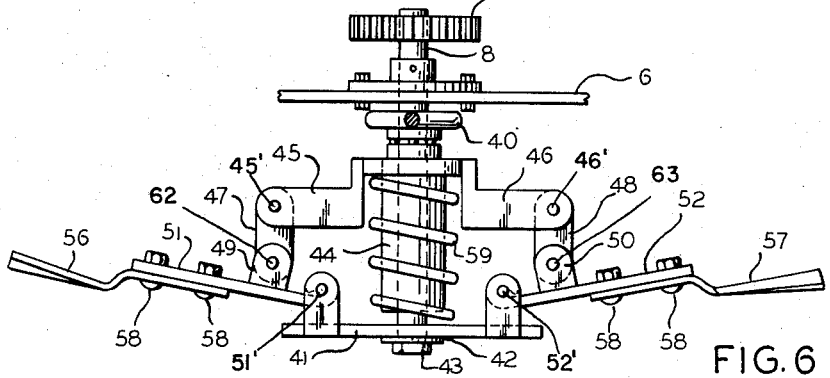
FIG. 6 is an enlarged detail side view showing the control mechanism illustrated in FIG. 5 in another position.
Figure 7:
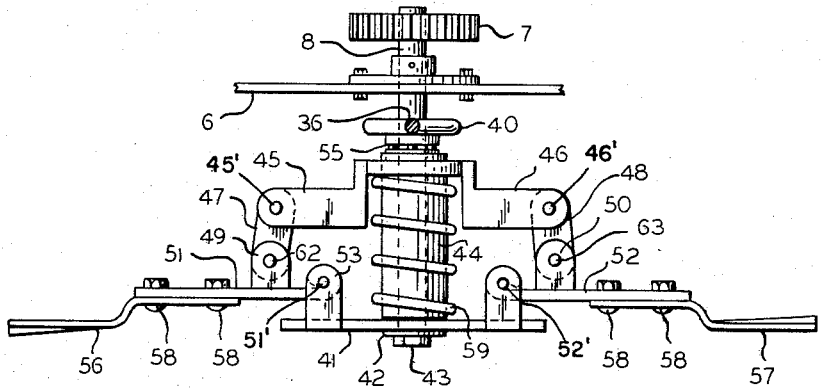
FIG. 7 is an enlarged detailed view similar to FIG. 6 showing the control mechanism in the position illustrated in FIG. 5.

The arm 31 on bell-crank 23 is pivotally connected at 32 to one end of the link 33 which extends through the aperture 34 in the body top 6 and to a point below the top where its opposite end is pivotally connected at 35 with one end of the rod 36. As indicated in FIGS. 5, 6 and 7, the opposite end of the rod 36 is pivoted at 37 on a bracket 38 secured to the under side of the body top 6. Intermediate the ends, the rod 36 is provided with a circular eye portion 40 which loosely embraces the shaft 8.

The shaft 8 extends to a point beneath the top 6 of the body where it is fixedly attached to a blade carrying plate 41 in any suitable manner as by means of washer 42 and nut 43. A sleeve 44 is slidably mounted on the shaft 8 and is provided with radially opposite arms 45 and 46 which are respectively pivotally connected at 45' and 46' to depending link 47 and 48. The lower ends of each link are respectively pivotally connected at 62 and 63 to a bracket 49 and 50 carried, respectively, on blade mounting arms 51 and 52 which are in turn each respectively pivotally mounted at one end on a pivot pin 51' and 52' brackets 53 and 54 secured to the blade carrying plate 41. Mounted on the shaft 8 and disposed between the upper end of the sleeve 44 and the shaft encircling portion 40 of the rod 36 is a thrust bearing 55. Cutting blades 56 and 57 are, respectively, removably secured to the blade mounting arms 51 and 52 by means of bolts and nuts 58.

When the blades 56 and 57 are disposed as shown in FIG. 6, the coil spring 59 encircling the sleeve 44 maintains them in that position by reason of its biasing action between the blade carrying plate 41 and the radial arms 45 and 46. This is the normal position of the blades 56 and 57 when the operator releases the manual control mechanism.

In greater detail, the link 33, the arms 45 and 46 and the brackets 49 and 50 are bifurcated to embrace the arm 31 on the bell-crank 23 and rod 36 and the depending links 47 and 48, respectively. The end 60 on the L-shaped carrier 20 is channeled to embrace the upper ends of the link 21 and angled portion of the bell-crank 23 and also the standard 25 is channeled to embrace the lower end of the link 21 and the end 61 on the bell-crank 23. As indicated in FIG. 5, the bracket 37 comprises two substantially identical right angle members disposed relatively upon opposite sides of the pivoted end of the rod 36.

When the operator desires to move the blades 56 and 57 to the grass cutting position shown in FIGS. 5 and 6, he will rotate the handle 15 in a clockwise direction relative to FIGS. 1 and 2. This will by means of the link 18 cause the L-shaped carrier 20 to first move from the position, shown in FIG. 3, about the pivot 22 on the link 21, then cause the link 21 to pivot downwardly in a counter clockwise direction about the pivot 26 which movement forces the bell-crank 23 to rotate counter clockwise about the pivot 27, thus forcing the link 33 to move the rod 36 downwardly about pivot 37. As the rod 36 moves downwardly, the portion 40 thereon forces the sleeve 44 on the shaft 8 into contact with the blade carrying plate 41 which acts as a stop against further downward movement of the sleeve. As the sleeve 44 slides downwardly, the arms 45 and 46 through the linkage 47 and 48 causes the blade mounting arms 51 and 52 to pivot downwardly about the pivots 62 and 63 in the brackets 49 and 50 and thereby position the blades 56 and 57 in the grass cutting position indicated in FIGS. 5 and 7.

Figure 4:
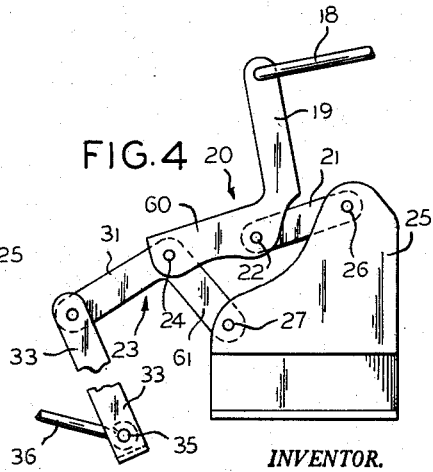
FIG. 4 is an enlarged detail view of the safety control mechanism shown in FIG. 3 illustrating another position of operation.

Preferably the pivots 22, 24, 26 and 27 are so oriented relatively to one another that upon release of the handle 15 by the operator, the coil spring 59 which biases the sleeve 44 upwardly will through the rod 36 cause the linkage, shown in FIGS. 2, 3 and 4, to return to the relative positions illustrated in FIG. 3. At the same time the blades 51 and 52 will move to the positions shown in FIG. 6 and thus dispose them within the body 1 above the lower margin of the depending apron 2. When thus positioned, even though still rotating about the shaft 8, and operator will not have his toes injured if accidentally placed under the lower margin of the body apron 2.

From the foregoing description and the drawings, it will be evident that a novel safety device has been provided which will automatically operate to avoid injury to an operator of a power mower of the type herein disclosed whenever the operator removes his hands from the handle bars. In other words, a power mower safety device has been provided which is operative to mow only when the operator manually controls the cutting blades and which is rendered safe when the operator releases his control.

It will also be apparent that a safety device has been provided which may be embodied in power mowers without material change in the mower structure, which embodies a simple arrangement of elements and which may be cheaply manufactured, easily assembled and is durable in operation.

One of the advantages of the invention herein disclosed is in the fact that the operator, without conscious effort, may feel safe from injury when starting the mower and while the mower is operating.

Various modifications will be obvious to those skilled in the art to which the present invention relates and it is intended that the following claims shall be interpreted as coming within the scope of invention herein disclosed.

I claim:

1. In a power operated mower having a vertically disposed rotatable shaft, the combination with a blade carrier plate secured to the lower end of said shaft and rotatable therewith, of a blade supporting arm extending radially of said shaft and pivotally mounted on said plate for movement about an axis normal to the axis of said shaft, means rotatable with and disposed between said plate and the upper end of said shaft, said means being movable longitudinally of said shaft and operatively connected with said arm to move said arm about said pivot axis, a coil spring disposed about said shaft and between said plate and means, said spring biasing means to position said arm and said blade above their normal cutting position, and manually operable means for moving said first mentioned means against the bias of said spring and maintaining said blade in its normal cutting position.

2. In a power operated mower having a vertically disposed rotatable shaft, the combination with a blade carrier plate secured to the lower end of said shaft and rotatable therewith, of a blade supporting arm pivotally mounted on said plate for movement about an axis normal to the axis of said shaft, biasing means urging said arm about said pivot to a position extending in a plane angling upwardly from a plane extending radially of the axis of said shaft, and manually operable means operative to move said arm downwardly about said pivot and against said biasing means to dispose said arm in a plane normal to the axis of said shaft.

3. In a power operated mower having a vertically disposed rotatable shaft, the combination with cutting blades extending radially of and rotatable with said shaft adjacent the lower end thereof for rotation in a plane substantially normal to the axis of said shaft, said blades being movable longitudinally relative to said shaft from said normal plane of rotation to a position above said normal plane and below the upper end of said shaft, biasing means urging said blades to said position, and manually controlled means operative to move said blades to said normal position of rotation against said biasing means, said biasing means automatically returning said blades to said position when said manually controlled means is released.

4. In a power operated mower, a vertically extending rotatable shaft in combination with a carrier plate secured to the lower end of said shaft and rotatable therewith, a pair of blades extending radially relative to the axis of said shaft and disposed on opposite sides of said shaft relative to each other, said blades each being pivotally mounted on said plate for movement about an axis normal to the axis of said shaft, a sleeve slidable on said shaft between said plate and the upper end of said shaft, a pair of arms secured to said sleeve and extending radially thereof upon opposite sides relative to each other, linkage connecting each of said arms to corresponding blade, a coil spring encircling said sleeve and disposed between said plate and arms and biasing said sleeve toward the upper end of said shaft, and manually controlled means operative to move said sleeve against the bias of said spring, whereby said blades may be manually maintained in a normal cutting position and automatically moved out of said position upon release of said manually controlled means.

5. In a power operated mower including a wheel supported body member having a depending skirt, a power motor supported by said body member and having rotatable shaft extending vertically through said body member and into the area defined by said skirt, and a handle bar secured to said body for maneuvering said mower, the combination with a blade supporting plate secured to the lower end of said shaft and rotatable therewith in a plane adjacent the lower margin of said skirt, of a pair of blade supporting arms pivotally mounted on said plate for movement about an axis normal to the axis of said shaft, said supporting arms each disposed on a side of said shaft opposite that of the other, a sleeve slidable on said shaft and having a pair of radially extending rigid arms, each upon a side opposite that of the other and disposed at the end of said sleeve most remote from said plate and directly above a corresponding blade supporting arm, linkage connecting each of said rigid arms with one of said supporting arms, a coil spring surrounding said sleeve and biasing said sleeve upwardly on said shaft and away from said plate, a rod extending horizontally beneath said body within the area defined by said skirt, said rod pivotally connected at one end to said body and having a circular eye portion intermediate its ends loosely embracing said shaft above said sleeve and engaging the upper end thereof, the other end of said rod terminating adjacent an aperture in the top of said body, control linkage mounted on said body adjacent said aperture, a control handle pivotally mounted on said handle bar, and means connecting said control handle to said control linkage and said control linkage to said other end of said rod, whereby manual manipulation of said control handle will move said sleeve against the bias of said spring and said blade supporting arms moved to dispose blades thereon in cutting position.

6. In a power operated mower including a wheel supported body member having a depending skirt, a handle bar carried thereby for maneuvering said mower, a power motor mounted on said body and having a rotatable shaft extending through said body member and into the area defined by said skirt, the combination with a blade carried by said shaft within said area extending in a radial direction relative to the axis thereof and rotatable therewith, means pivotally supporting said blade from said shaft on an axis normal to the axis of said shaft, means biasing said blade on said pivotal support upwardly into said area above a plane extending radially of the axis of said shaft and coincident with axis of said pivot for said blade, and manually operable control means pivotally mounted on said bar and including linkage in opposition to said biasing means, whereby manual manipulation of said control means moves said blade about its pivotal mounting to a grass cutting position in a plane normal to the axis of said shaft, said control means being rendered inoperative by said biasing means when manual control is removed.

References Cited in the file of this patent

UNITED STATES PATENTS

| | | |
|---|---|---|
| 2,483,683 | Wells et al. | Oct. 4, 1949 |
| 2,551,817 | Taylor | May 8, 1951 |
| 2,697,323 | Horn | Dec. 21, 1954 |
| 2,707,362 | Thelander | May 3, 1955 |
| 2,740,249 | Stearns | Apr. 3, 1956 |
| 2,985,992 | Dowdle | May 30, 1961 |
| 2,993,329 | Schmidt | July 25, 1961 |